(12) United States Patent
Matityahu et al.

(10) Patent No.: US 7,522,543 B2
(45) Date of Patent: Apr. 21, 2009

(54) HIGH-SPEED COMMUNICATIONS NETWORK TAP WITH ZERO DELAY

(75) Inventors: Eldad Matityahu, Palo Alto, CA (US); Robert E. Shaw, Los Gatos, CA (US); Philip J. Gentile, Redwood, NY (US)

(73) Assignee: Net Optics, Inc., Santa Clara, CA (US)

( * ) Notice: Subject to any disclaimer, the term of this patent is extended or adjusted under 35 U.S.C. 154(b) by 582 days.

(21) Appl. No.: 11/223,477

(22) Filed: Sep. 8, 2005

(65) Prior Publication Data

US 2007/0064917 A1    Mar. 22, 2007

(51) Int. Cl.
*H04B 7/14* (2006.01)
*H04B 3/36* (2006.01)
*G06F 15/173* (2006.01)

(52) U.S. Cl. .................. 370/279; 370/293; 370/465; 709/224

(58) Field of Classification Search ............. 370/279, 370/293, 463, 464–465; 709/224
See application file for complete search history.

(56) References Cited

U.S. PATENT DOCUMENTS

| 6,424,627 B1* | 7/2002 | Sørhaug et al. ............. 370/241 |
| 2003/0215236 A1* | 11/2003 | Manifold ..................... 398/79 |
| 2004/0190547 A1* | 9/2004 | Gordy et al. ................. 370/463 |
| 2006/0215566 A1* | 9/2006 | Walsh ......................... 370/241 |

* cited by examiner

*Primary Examiner*—Tri H Phan
(74) *Attorney, Agent, or Firm*—IP Strategy Group, P.C.

(57) ABSTRACT

A high-speed communications network tap includes a first terminal and a second terminal adapted to couple the tap in-line in the network and communicate data with network devices. A duplicator is coupled to the first terminal and the second terminal and configured to duplicate the data as a copy of the data. A processor is coupled to the duplicator and to a third terminal, and is configured to receive the copy of the data from the duplicator and to provide the data to the third terminal. The third terminal is adapted to couple the tap to a network monitor and send data to the network monitor. Advantages of the invention include the ability to duplicate high-speed communication network data for monitoring in an essentially zero delay.

9 Claims, 4 Drawing Sheets

HIGH-SPEED COMMUNICATIONS NETWORK TAP WITH ZERO DELAY

FIELD

The present invention relates to a high-speed communications network tap with virtually zero delay.

BACKGROUND

Telecommunications networks are important for providing global data and voice communication. Monitoring the networks is important to ensure reliable operation, fault detection, timely mitigation of potentially malicious activities and more. Network taps are known for connecting to networks and providing a port to monitor the communication traffic on the network. Network monitors are known for providing information to other network elements.

However, conventional network taps use store and forward techniques that cause a delay in the network traffic. Such a delay is undesirable because it generates communication latency and can adversely affect the communications network. These undesirable attributes are even more pronounced in ultra-high-speed networks operating at gigabit speeds.

What is needed is a network tap that can duplicate network traffic, while creating only an insubstantial delay into the network traffic.

SUMMARY

The present invention provides an improved network tap that can duplicate network traffic, while creating only an insubstantial delay into the network traffic. This insubstantial delay is referred to as a zero delay since the tap does not directly affect the network traffic in the manner of convention store and forward type taps. Rather, the invention provides a technique to duplicate the network traffic in a parasitic manner by sensing the traffic and then replicating the traffic in a parallel manner. The original traffic is permitted to continue to its destination, while the copied traffic is forwarded to one or more monitors for review and potential action.

An exemplary embodiment of a high-speed communications network tap includes a first terminal and a second terminal adapted to couple the tap in-line in the network and communicate data with network devices. A duplicator is coupled to the first terminal and the second terminal and configured to duplicate the data as a copy of the data. A processor is coupled to the duplicator and to a third terminal, and is configured to receive the copy of the data from the duplicator and to provide the data to the third terminal. The third terminal is adapted to couple the tap to a network monitor and send data to the network monitor.

In one aspect of the invention, the coupler includes a uni-directional coupling circuit. In another aspect of the invention, the coupler includes a plurality of uni-directional coupling circuits. In another aspect of the invention, the coupler includes a plurality of bi-directional coupling circuits. In one aspect of the invention, the coupler includes a detector configured to generate a phase and amplitude modulation signal for each of the communication lines between the network devices.

In one aspect of the invention, the processor includes an analog to digital converter for each of the lines of communication between the network devices, a digital signal processor coupled to each of the analog to digital converters, and a correlator coupled to each of the digital signal processor and configured to generate a correlated output signal to the third terminal.

Advantages of the invention include the ability to duplicate high-speed communication network data for monitoring in an essentially zero delay.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to network traffic and packets, while other forms of data and addresses can be used in the invention. The terminals described herein are RJ-45 terminals that include 8 wires, which can carry 4 differential pair signals. As used herein, the term data is generally referred to as including both analog data and digital data, for example data packets. The invention is applicable to both wire and optical technologies. In the even that a fiber optic communication link is used with bi-directional optical traffic, a separation device such as a dielectric, wave division coupler or other mechanism may be used to separate out the traffic.

Figure 1:
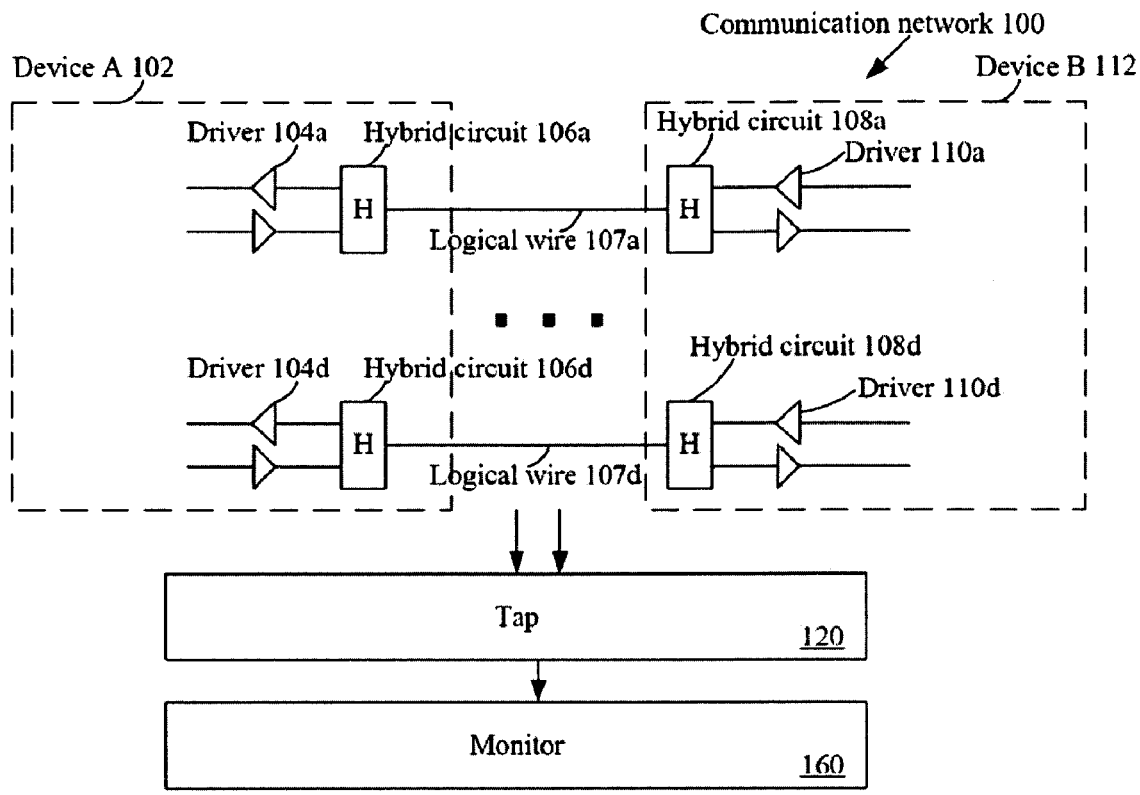
FIG. 1 depicts a high-speed communications network showing a tap and monitor to be inserted into the network between device A and device B according to an embodiment of the invention.

FIG. 1 depicts a high-speed communications network 100 showing a tap and monitor to be inserted into the network between device A 102 and device B 112 according to an embodiment of the invention. These network devices are, for example, a switch and a router, but can also represent other types of network devices, server computers, client computers and so forth.

The exemplary embodiments are directed to high-speed communications, for example, gigabit Ethernet, but are applicable to all types of communication protocols. Gigabit Ethernet employs four differential pair lines that are depicted as logical wires 107a-d. Naturally, any number of communication lines can be used with the invention. Since gigabit Ethernet uses bi-directional differential pair communications, using drivers 104a-d, 110a-d, each of the devices includes a series of hybrid circuits 106a-d, 108a-d, respectively, to filter the outbound and inbound signals from one another and avoid cross-talk or back-talk.

A network tap 120 is disposed in-line between the network devices 102, 112 and is configured to permit a zero delay bi-directional communication between the devices, as described below. The network tap is also coupled to a network monitor 150, which can be an intrusion detection device (IDS), intrusion prevention device (IPS) or other type of monitor or analyzer.

Figure 2:
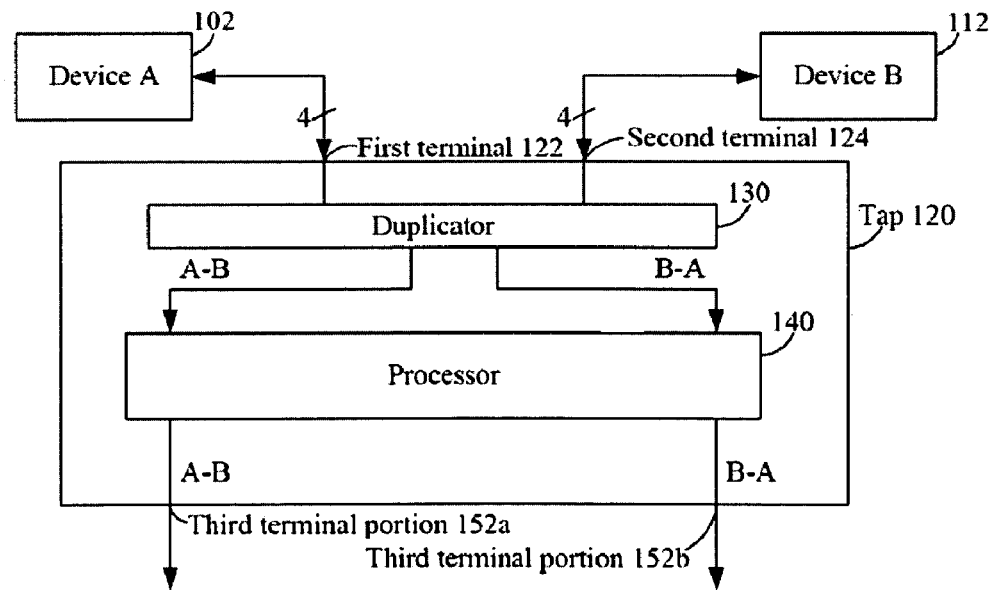
FIG. 2 depicts a high-speed communications network tap with zero delay according to an embodiment of the invention.

FIG. 2 depicts a high-speed communications network tap with zero delay according to an embodiment of the invention. Tap 120 includes a first terminal 122 and a second terminal 124 adapted to couple the tap in-line in the network and communicate data with network devices, for example, device A 102 and device B 112. A duplicator 130 is coupled to the first terminal and the second terminal and configured to duplicate the data as a copy of the data. A processor 140 is coupled to the duplicator and to a third terminal 152a-b, and configured to receive the copy of the data from the duplicator and to provide the data to the third terminal. The third terminal is adapted to couple the tap to a network monitor 160 and send data to the network monitor. In one aspect, third terminal portion 152a is a RJ-45 connector and portion 152b is a second RJ-45 connector.

Figure 3A:
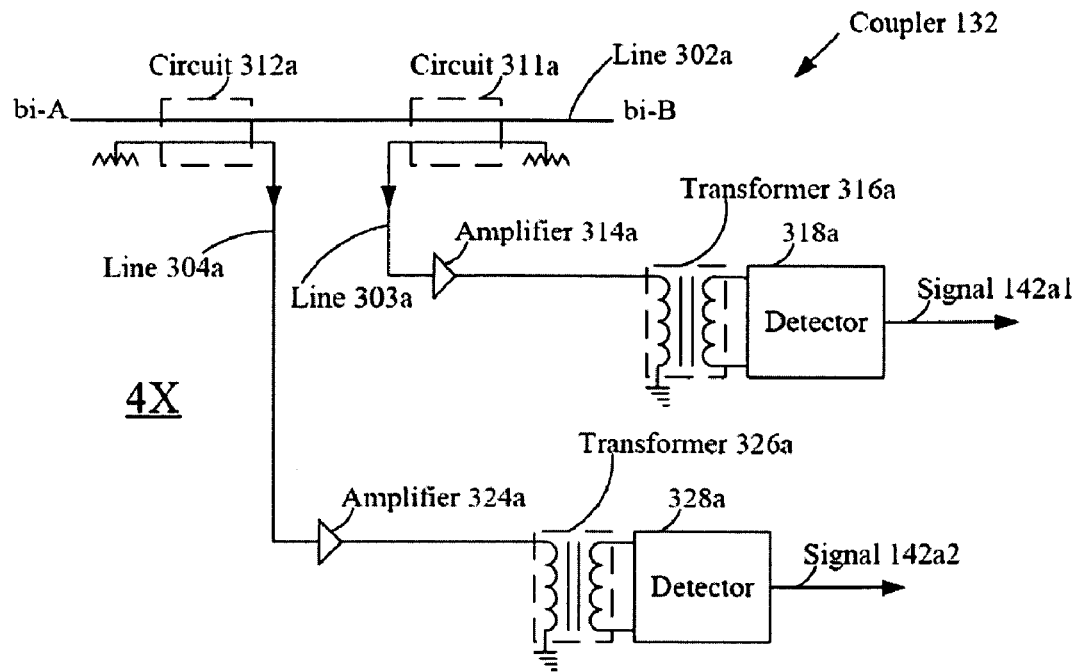
FIGS. 3A-B depict a coupler according to embodiments of the invention.

FIG. 3A depicts a coupler 132 according to an embodiment of the invention. The reference number 132 is given to represent internal electronics of a first exemplary embodiment of the duplicator 130. Coupler 132 provides a circuit that duplicates the network traffic between device A 120 and device B 112 in a uni-directional manner. In a high-speed configuration including four communication lines, four identical circuits shown in 132 are provided, one for each line. The exemplary line 302a is represented from "bi-A" to "bi-B" and a circuit 311a couples the signal on line 302a to line 303a. The coupling provided by circuit 311a results in the signal on line 303a attenuated about −10 dB from the original signal. This coupling can be performed using a technique such as a stripline, microstrip, discrete transformers and resistor networks or other similar technology that does not materially affect the original signal, which permits the original data to continue to its destination with essentially zero delay. The copied signal on line 303a is then routed to an amplifier 314a, for example a 10 dB amplifier, to boost the copied signal to a working level. A transformer 316a communicates the signal to a signal detector 318a that replicates the communication traffic data. The detector signal is output as signal 142a1.

A circuit 312a couples the signal on line 302a to line 304a. The coupling provided by circuit 312a results in the signal on line 304a attenuated about −10 dB from the original signal. This coupling can be performed using a technique such as a stripline, microstrip, discrete transformers and resistor networks or other similar technology that does not materially affect the original signal, which permits the original data to continue to its destination with essentially zero delay. The copied signal on line 304a is then routed to an amplifier 324a, for example a 10 dB amplifier, to boost the copied signal to a working level. A transformer 326a communicates the signal to a signal detector 328a that replicates the communication traffic data. The detector signal is output as signal 142a2.

One exemplary benefit of using two uni-directional couplers 311a, 312a are that impedances can be accurately matched or balanced to keep disturbance of the main line 302a to as little as possible.

Figure 3B:
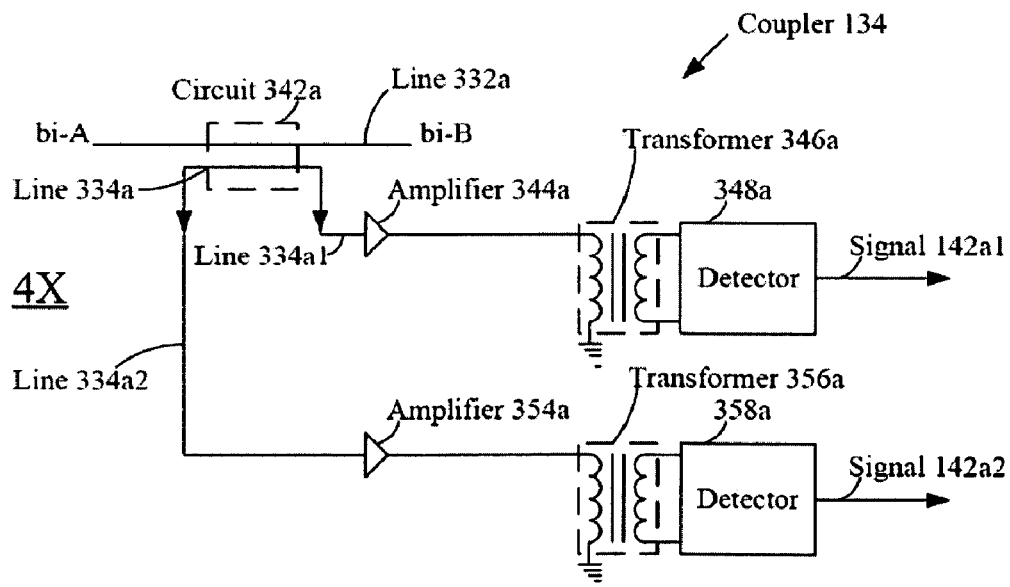

FIG. 3B depicts a coupler 134 according to an embodiment of the invention. The reference number 134 is given to represent internal electronics of a second exemplary embodiment of the duplicator 130. Coupler 134 provides a circuit that duplicates the network traffic between device A 120 and device B 112 in a bi-directional manner. In a high-speed configuration including four communication lines, four identical circuits shown in 134 are provided, one for each line. The exemplary line 322a is represented from "bi-A" to "bi-B" and a circuit 342a couples the signal on line 332a to line 334a. The coupling provided by circuit 342a results in the signal on line 334a about −10 dB from the original signal. This coupling can be performed using a technique such as a stripline, microstrip, discrete transformers and resistor networks or other similar technology that does not materially affect the original signal, which permits the original data to continue to its destination with essentially zero delay. This second embodiment provides two directions for the copied signal, one resulting on line 334a1 and the other on line 334a2. The copied signal on line 334a1 is then routed to an amplifier 344a, for example a 10 dB amplifier, to boost the copied signal to a working level. A transformer 346a communicates the signal to a signal detector 348a that replicates the communication traffic data. The copied signal on line 334a2 is routed to an amplifier 354a, for example a 10 dB amplifier, to boost the copied signal to a working level. A transformer 356a communicates the signal to a signal detector 358a that replicates the communication traffic data. The detector signal is output as signals 142a1 and 142a2, respectively.

One exemplary benefit of using a bi-directional coupler 342a is that it employs fewer couplers that might disturb the main line 332a, but impedance should be matched or balanced as close a reasonably possible to keep disturbance of the main line 342a to as little as possible.

As described above, the number of communication lines between the network devices is arbitrary since the invention can operate with any number of such communication lines. In one aspect the number of couplers is equal to the number of communication lines between the network devices.

In one aspect of the invention, the coupler includes a detector configured to generate a phase and amplitude modulation signal (PAM) for each of the communication lines between the network devices. The exemplary embodiment uses PAM 5 signals, which are PAM signals having 5 levels.

Figure 4A:
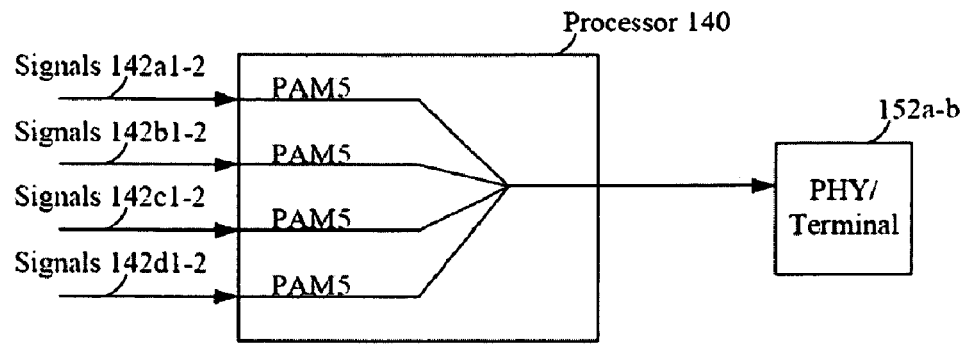
FIGS. 4A-B depict a processor according to an embodiment of the invention.

FIG. 4A depicts a processor 140 according to an embodiment of the invention. Signals 142a-d from the detectors in FIG. 3A or 3B are provided to the processor 140. The processor converts the PAM signals into standard communication protocol signals for sending to the monitor, for example, serial gigabit, SGMII, or other format. This is performed using a buffering technique that converts to a single time synchronized serial bit stream. In one aspect, the serial to SGMII is converted from 10-bit data to 8-bit data to conform to the desired format. The signal is then provided to a physical interface that communicates with terminal 152a-b, which is an RJ-45 terminal.

Figure 4B:
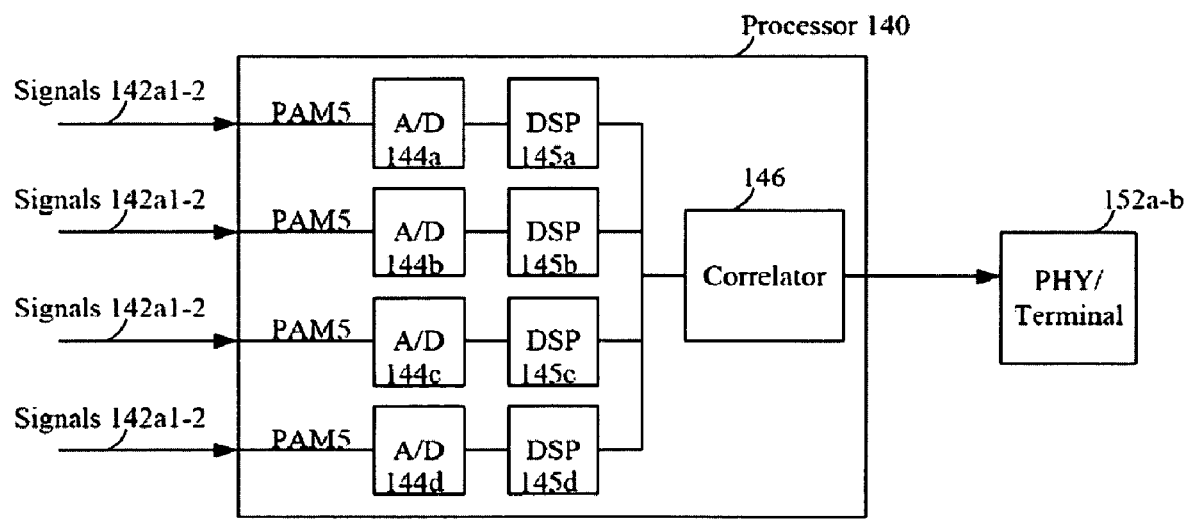

FIG. 4B depicts an exploded embodiment of processor 140 according to an embodiment of the invention. This embodiment shows an analog to digital converter (A/D) 144a-d for each of the signal 142a-d from the detectors in FIG. 3A or 3B. The A/D converters provide digital signals to digital signal processors (DSP) 145a-d, respectively, that process to digitized signal into uncorrelated data streams. A correlator 146 is provided to align the signal and to produce the correlated signals to the physical output, e.g. GMII or SGMII.

Figure 5:
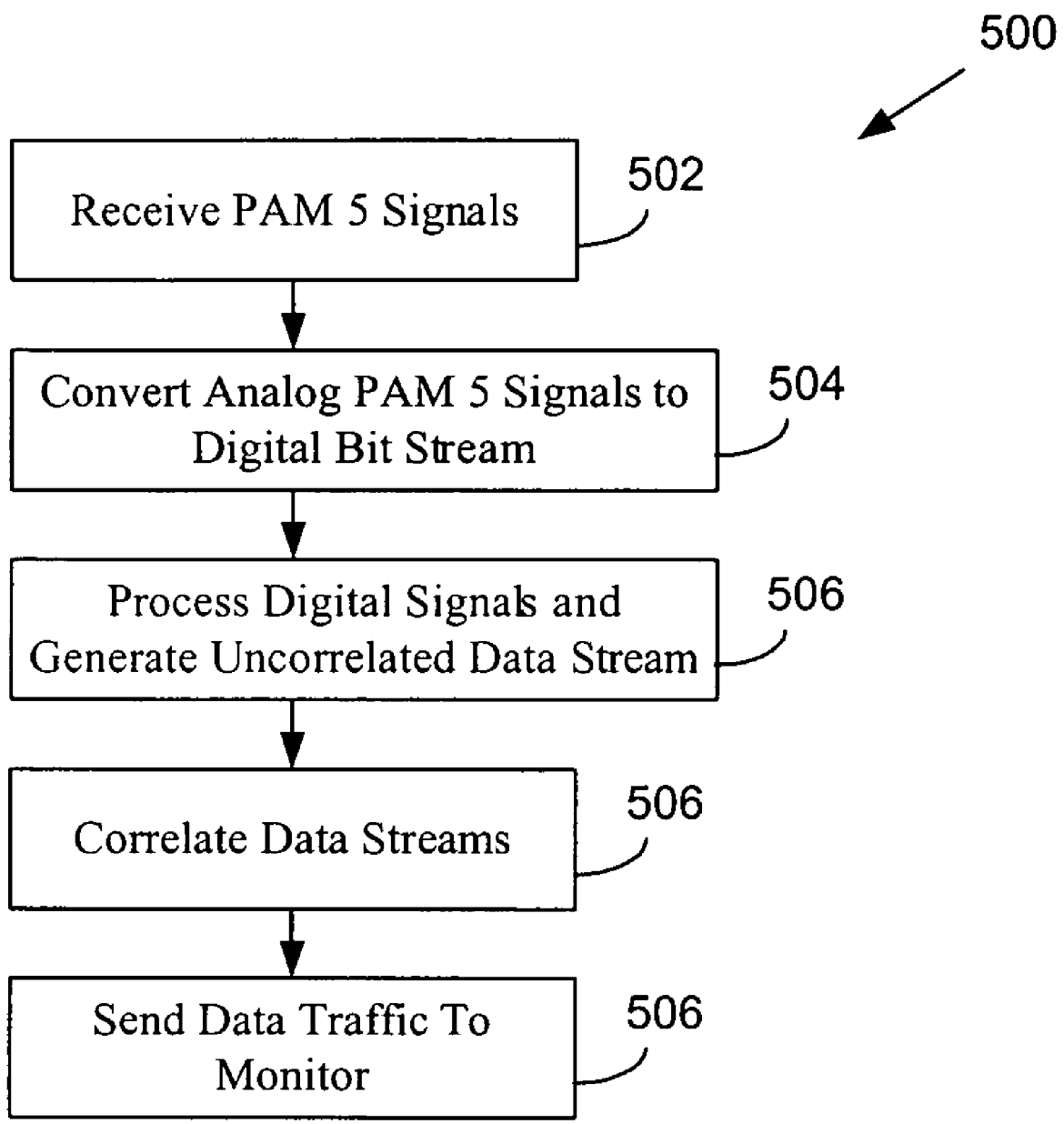
FIG. 5 is a flowchart showing a method according to an embodiment of the invention.

FIG. 5 is a flowchart 500 showing a method according to an embodiment of the invention. In step 502 the signals are sent from the duplicator to the processor. In the exemplary embodiment, these signals are in the form on PAM 5 signals. In step 504, the signals are converted to a serial bit stream. In step 506, the serial bit stream is sent to the monitor.

Advantages of the invention include the ability to duplicate high-speed communication network data for monitoring in an essentially zero delay.

Having disclosed exemplary embodiments and the best mode, modifications and variations may be made to the disclosed embodiments while remaining within the subject and spirit of the invention as defined by the following claims.

The invention claimed is:

1. A communications network tap, comprising:
   a first terminal and a second terminal for coupling the tap in-line in the network and for communicating data with network devices;
   a third terminal for coupling the tap to a network monitor for data transmission to the network monitor;
   a duplicator coupled to the first terminal and the second terminal and configured to duplicate the data as a copy of the data; and
   a processor coupled to the duplicator and to the third terminal for receiving the copy of the data from the duplicator and for providing the copy of the data to the third terminal,
   wherein the processor includes analog to digital converters that include an analog to digital converter for each of lines of communication between the network devices, digital signal processors that include a digital signal processor coupled to each analog to digital converter of the analog to digital converters, and a correlator coupled to the digital signal processors for generating a correlated output signal to the third terminal.

2. The communications network tap of claim 1, wherein:
   the first terminal and second terminal are applicable to a gigabit communication protocol.

3. The communications network tap of claim 1, wherein:
   the first terminal and the second terminal are configured to early multiple lines of communication between the network devices; and
   the duplicator includes a coupler circuit for each of the lines of communication between the network devices.

4. The communications network tap of claim 3, wherein:
   the duplicator includes a two uni-directional coupler circuits for each of the lines of communication between the network devices.

5. The communications network tap of claim 3, wherein:
   the duplicator includes a bi-directional coupler circuit for each of the lines of communication between the network devices.

6. A method of duplicating information from a communications network using a communications network tap, the method comprising the steps of:
   coupling the tap in-line in the network between a first terminal and second terminal;
   communicating data between the tap and network devices;
   duplicating the data as a copy of the data using a duplicator;
   coupling the tap to a network monitor using a third terminal;
   receiving the copy of the data from the duplicator;
   providing the copy of the data to the third terminal;
   providing analog to digital converters that include an analog to digital converter for each of lines of communication between the network devices;
   coupling digital signal processors to the analog to digital converters with a digital signal processor coupled to each analog to digital converter of the analog to digital converters;
   coupling a correlator to the digital signal processors;
   generating a correlated output signal using the correlator; and
   providing the correlated output signal to the third terminal.

7. The method of claim 6, wherein:
   the first terminal and the second terminal are configured to carry multiple lines of communication between the network devices; and
   the duplicator includes a coupler circuit for each of the lines of communication between the network devices.

8. The method of claim 7, wherein:
   the duplicator, includes a two uni-directional coupler circuits for each of the lines of communication between the network devices.

9. The method of claim 7, wherein:
   the duplicator includes a bi-directional coupler circuit for each of the lines of communication between the network devices.

* * * * *